Aug. 2, 1960 H. GRAYSON ET AL 2,947,946

MAGNETIC SWITCH-AMPLIFIERS

Filed Feb. 15, 1954 4 Sheets-Sheet 1

Inventors
H. GRAYSON
R. A. G. DUNKLEY
T. H. WALKER
By Robert Harding Jr.
Attorney Inventors
H. GRAYSON-
R. A. G. DUNKLEY-
T. H. WALKER
By Robert Harding Jr.
Attorney Inventors
H. GRAYSON
R. A. G. DUNKLEY
T. H. WALKER
By
Attorney Aug. 2, 1960 H. GRAYSON ET AL 2,947,946

MAGNETIC SWITCH-AMPLIFIERS

Filed Feb. 15, 1954 4 Sheets-Sheet 4

Inventors
H. GRAYSON
R. A. G. DUNKLEY
T. H. WALKER
By [signature]
Attorney

United States Patent Office 2,947,946

Patented Aug. 2, 1960

2,947,946

MAGNETIC SWITCH-AMPLIFIERS

Harry Grayson, Rowland Arthur George Dunkley, and Thomas Harold Walker, London, England, assignors to International Standard Electric Corporation, New York, N.Y.

Filed Feb. 15, 1954, Ser. No. 410,387

Claims priority, application Great Britain Feb. 17, 1953

1 Claim. (Cl. 330—8)

This invention relates to the switching of alternating currents. The object of the invention is the provision of a switching system using only magnetic cores, resistors, condensers and rectifiers. Such a system has an advantage over existing electromechanical systems and electronic systems using tubes in that the components have extremely long life. Durability can be further increased by embedding the magnetic components in materials such as synthetic resin.

The devices to be described are based on the second harmonic transformer and have been designed to be particularly suitable for the switching of voice frequencies in telephone exchange systems. However, it is to be clearly understood that the invention is not to be restricted to that application and that the principles to be disclosed could equally well be applied to the switching of alternating currents of other frequencies. Moreover, while the invention has been described with reference to a particular construction of second-harmonic transformer, any convenient construction may be employed.

The main feature of the invention comprises a magnetic switch-amplifier comprising a first second-harmonic transformer and a second second-harmonic transformer, means for applying a first alternating current to the primary winding of said first second-harmonic transformer, means for applying a direct current control signal to a first secondary winding of said first second-harmonic transformer, means for applying alternating current induced in a second secondary winding of said first second-harmonic transformer to the primary winding of said second second-harmonic transformer, means for applying an information-bearing signal of variable amplitude to a secondary winding of said second second-harmonic transformer and demodulating means for obtaining from the current in the primary winding of said second-harmonic transformer an information-bearing signal of variable amplitude.

This invention will be described with reference to the accompanying drawings in which.

Figure 6:
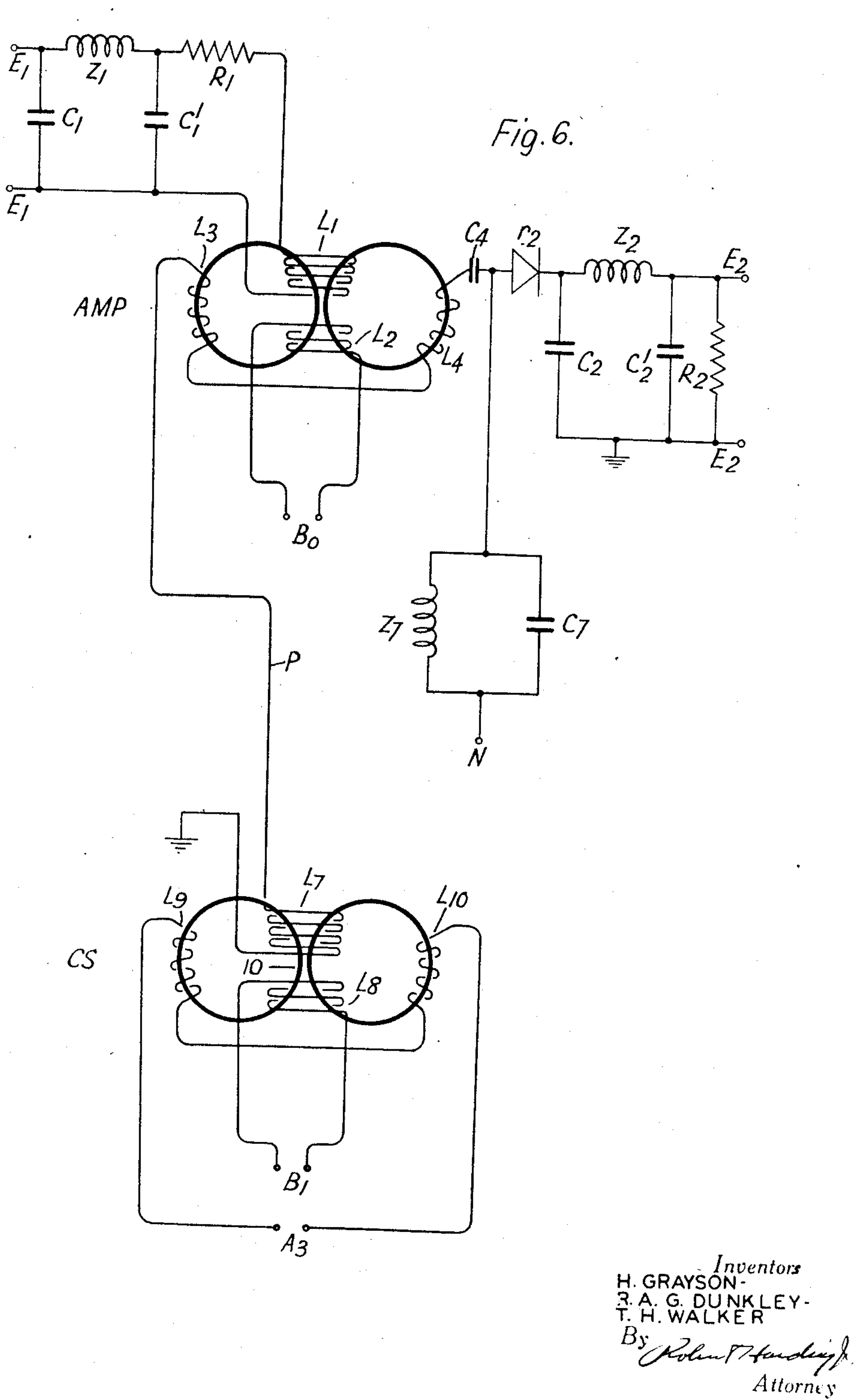
Fig. 6 is a switch amplifier useful in the construction of selector switches for voice frequency switching systems.
Figures 7, 9:
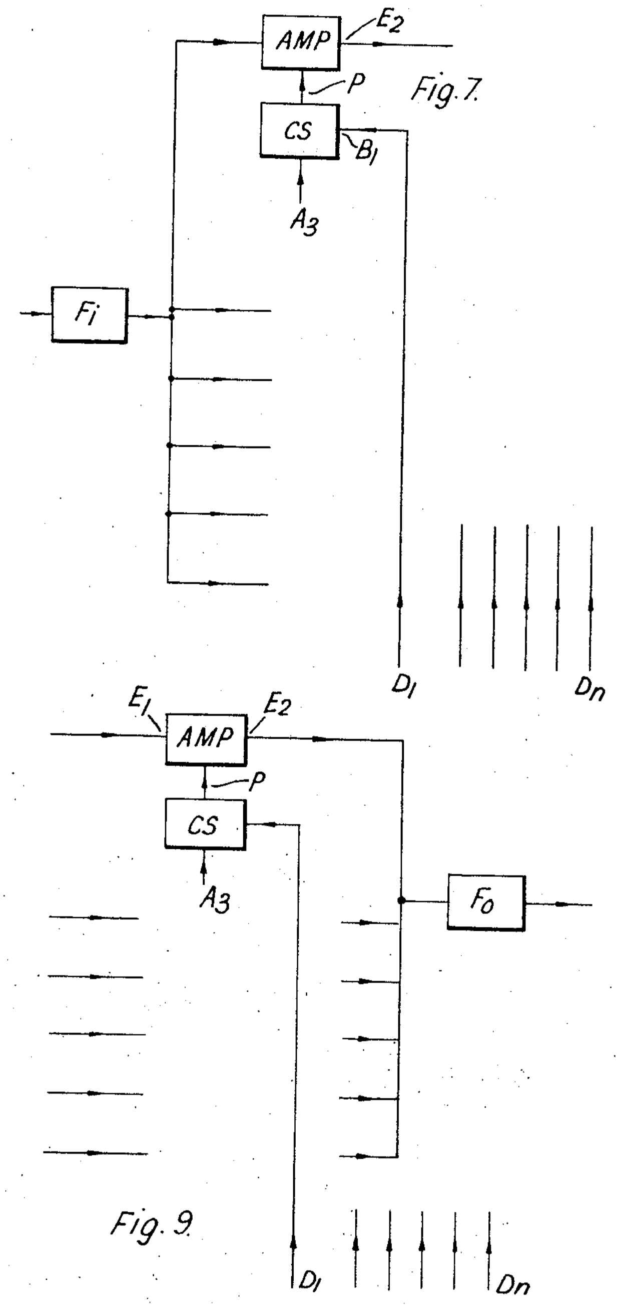
Figure 8:
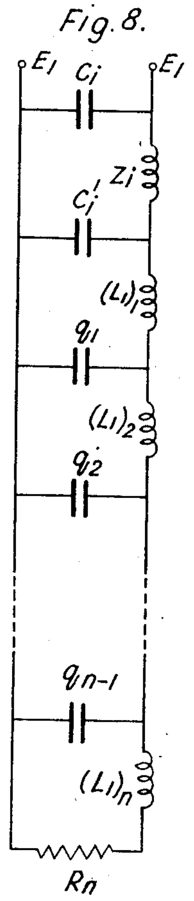

Figs. 7, 8, and 9 show schematically selector switches employing the switch amplifier of Fig. 6.

In the application of the invention which is to be described, alternating magnetic fluxes of high frequency are encountered which present problems not met with when the principles of the invention are applied to the switching of lower frequencies.

It may be shown that if a voltage E of frequency F is applied to an iron cored winding so that a current I flows, then $$EI = \frac{B^2_{max} V f \cdot 10^7}{4} \qquad (1)$$

where $B_{max}$ is the maximum flux density (at saturation), $f$ is the permeabiltiy of the magnetic material and V is its volume. Suppose that the magnetic material employed were Permalloy "C" then $$B_{max} = 8{,}000$$

$$f = 1{,}000$$

Suppose also that the applied frequency was 100 kc./s. and that EI was 1 volt-amp., then substituting in (1) above it is found that $$V = .00625 \text{ cc.}$$

It is therefore obvious that at frequencies such as 100 kc./s. the volume of the core-member of any magnetic device must be very small. The design of the devices to be described has been influenced by the need to minimise the amount of magnetic material used. However, in practice, design is aided by the fact that any volume of saturable magnetic material behaves as a smaller volume due to skin effects.

Figure 1:
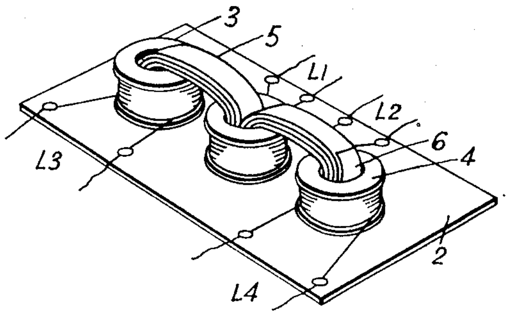
Figs. 1 and 2 show respectively in perspective and in elevation a preferred construction for a magnetic amplifier.
Figure 2:
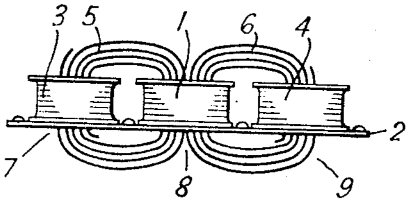

Referring to Figs. 1 and 2 a construction for a magnetic amplifier designed with these considerations in mind consists of four windings $L_1$, $L_2$, $L_3$ and $L_4$. The windings $L_3$ and $L_4$ are wound on the bobbins 3 and 4 respectively. The windings $L_1$ and $L_2$ are both wound on a single bobbin 1. After the coils have been wound the bobbins are mounted on a tag-board 2.

After mounting, two lengths of tape of a saturable magnetic material are threaded spirally through the bobbins so as to form the two loops 5 and 6. The two loops then together constitute a three-limbed core, the three limbs being designated 7, 8 and 9.

Figure 3:
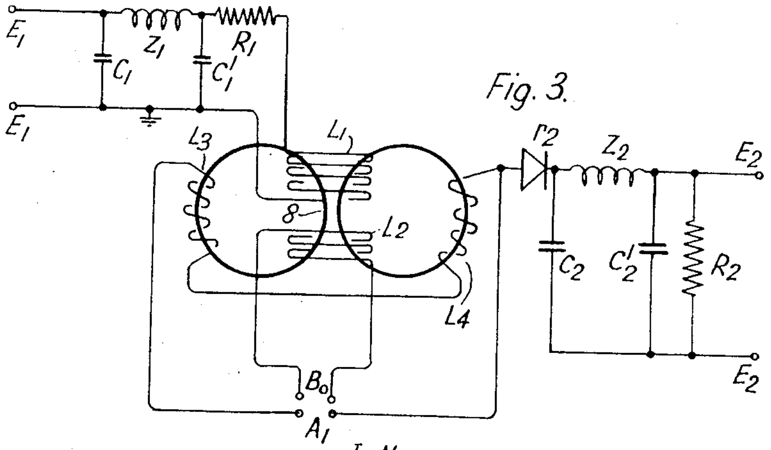
Fig. 3 shows the electrical circuit of the magnetic amplifier of Figs. 1 and 2.

Fig. 3 shows diagrammatically the component described with reference to Figs. 1 and 2, together with the associated circuits necessary for its functioning as a magnetic amplifier for voice frequencies.

The coils $L_3$ and $L_4$ wound on the outer bobbins 3 and 4 of Fig. 1 are connected in series to a source of carrier frequency at the terminals $A_1$. A direct current bias is applied across the terminals $B_0$. The considerations affecting the choice of the magnitude of this bias will be discussed later.

Now, it is well-known that if a sinusoidal voltage is applied to the primary of a transformer, of an amplitude sufficient to extend the hysteresis loop into the region of saturation, then the potential appearing on the secondary winding will possess the same frequency as the applied voltage, together with odd harmonics. As long as the hysteresis loop is symmetrical this will be the case, since the symmetry precludes the production of even harmonics. However, if a small direct-current flux is superimposed upon the alternating flux in the ferro-magnetic core of the transformer, then even harmonics will also appear in the secondary winding.

Referring again to Fig. 3 it will be seen that the two coils $L_3$ and $L_4$ are wound in the same sense so that the magnetic fluxes through the common member 8 of the three-limbed core, due respectively to the coils $L_3$ and $L_4$ are opposed. Thus the fundamental frequency and odd harmonics cancel, leaving only even harmonics, of which the second will predominate, in the secondary winding L.

The voice frequency to be amplified is applied across the terminals $E_1$. It is necessary to insert the filter-section constituted by the inductance $Z_1$ and the condensers $C_1$ and $C_1'$ to prevent the even harmonics induced in the coil $L_1$ appearing at the terminals $E_1$. The resistance $R_1$ is necessary for correct termination of the voice-frequency circuit.

Figure 4:
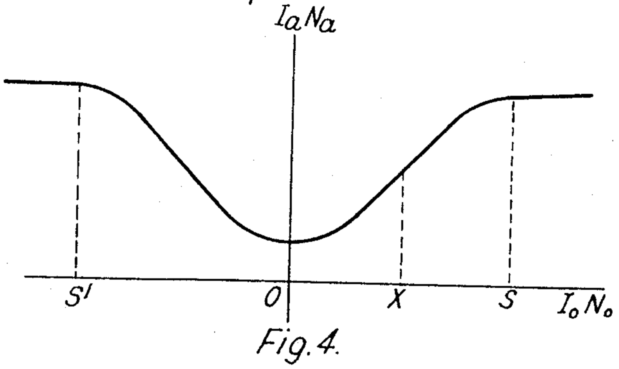
Fig. 4 is a curve relating to the circuit of Fig. 3.

The choice of the magnitude of the direct current bias applied across the terminals $B_0$ will now be considered. Fig. 4 shows the general shape of the graph of A.C. ampere-turns in the carrier circuit $L_3$—$L_4$ ($I_a N_a$) plotted against the total ampere-turns in the coils $L_1$ and $L_2$ ($I_o N_o$). As the value of the ampere-turns for the coil $L_2$ for example increases either positively or negatively (i.e. as the bias current in $L_2$ increases in either direction) the value of the ampere-turns in the carrier circuit increases slowly at first, then more quickly, and continues to increase steadily until a limiting value is reached either at S or S'. Thus the current due to the voice frequency signal in the coil $L_1$ causes an excursion along the characteristic about some point determined by the D.C. bias current in $L_2$. By a suitable choice of a standing bias in the direct current winding $L_2$ the amplifier can be biassed to work over a linear part of its characteristic, as for instance about the point X.

The output for the amplified voice frequency is at the terminals $E_2$. The modulated carrier signal is demodulated by the rectifier $r_2$. The low-pass filter section constituted by the inductance $Z_2$ and the condensers $C_2$ and $C'_2$ is designed to suppress the carrier frequency so as to prevent its appearing at the terminals $E_2$.

In a particular practical case the coils $L_1$ and $L_2$ consisted of respectively 180 and 120 turns while $L_3$ and $L_4$ had each 80 turns. The coils were wound on bobbins of approximately .4 inch diameter. Each of the loops 5 and 6 comprised a 30 inch length of .001 inch tape, ⅛ inch wide of the material known as Permalloy "C." The inductances $Z_1$ and $Z_2$ were each 32 microhenries and the condensers $C_1$, $C'_1$, $C_2$ and $C'_2$ were each .05 microfarad, the cut-off frequency being in the region of 3 kc./s. The carrier frequency used was 100 kc./s.

Figure 5:
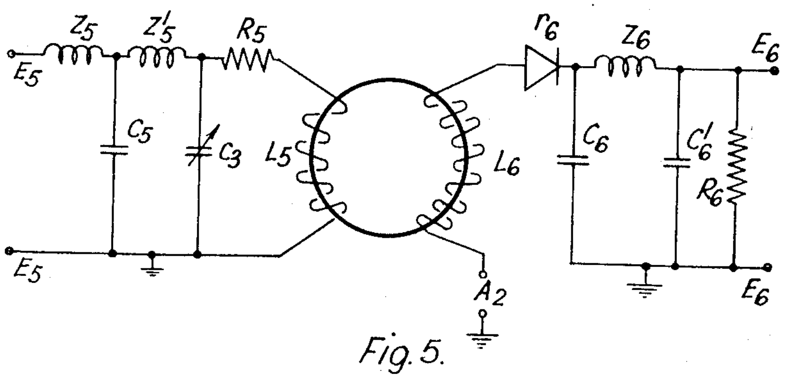
Fig. 5 is an alternative circuit for a magnetic amplifier.

Fig. 5 shows an alternative form of magnetic amplifier for voice frequencies in which the magnetic core comprises a single spiral loop of saturable material. Carrier is applied across the terminals $A_2$. The voice frequency input is at the terminals $E_5$.

In the circuit shown no provision has been made for preventing induction of the fundamental carrier frequency in the winding $L_5$ by balancing. However, this could be done by winding the coil $L_6$ in two parts in such a way that the A.C. fluxes were opposed. Without this precaution the low-pass filter-section constituted by the inductances $Z_5$ and $Z_5'$ and the condenser $C_5$ has to be designed to suppress both the fundamental carrier frequency and its harmonics. In this instance a T filter section has been chosen because a capacity low-pass filter would be equivalent to a direct shunt on the carrier supply. A small trimming condenser $C_3$ may be provided, adjustable to the point of maximum gain of the amplifier.

This amplifier can be conveniently constructed in a manner similar to that already described. In a particular practical case the core comprised a 30 inch length of .001 inch tape, ⅛" wide of Permalloy "C." The voice frequency winding $L_5$ was of 250 turns and the carrier winding $L_6$ was 100 turns. The inductances $Z_5$ and $Z_5'$ were each 16 microhenries, the condenser $C_5$ was .09 microfarad, the inductance $Z_6$ was 32 microhenries, the condensers $C_6$ and $C_6'$ were each .045 microfarad and the resistances $R_5$ and $R_6$ were each 600 ohms. Optimum gain was achieved when the condenser $C_3$ was adjusted to about 1000 picofarads.

Referring to Fig. 6 a component for a magnetic switching system for voice frequencies comprises a voice frequency amplifier AMP and a carrier switch CS. The amplifier is that already described with reference to Fig. 3 modified by the inclusion of the condensers $C_4$ and $C_7$ and the inductance $Z_7$, the purpose of which will be described later.

The carrier switch CS is preferably of a similar construction to that previously described for the magnetic amplifier. The coils $L_9$ and $L_{10}$ have equal numbers of turns and are wound in the same direction, so that when the carrier frequency is applied at $A_3$ the alternating fluxes are opposed in the common limb 10 and there is no voltage induced in the windings $L_7$ and $L_8$. However, if a direct current bias is applied across the terminals $B_1$, the flux balance is upset by the field of the winding $L_8$ and a voltage is induced in the winding $L_7$.

In a particular practical case the windings $L_7$ and $L_8$ were each of 120 turns, while $L_9$ and $L_{10}$ were of 80 turns. The applied carrier frequency was 50 volts R.M.S. at 50 kc./s. With the switch "on," that is with direct current bias in the winding $L_8$, about 40 volts at 100 kc./s. appeared at the output of the winding $L_7$. When the switch was "off," that is without direct current bias, approximately one volt appeared at the output due to imperfections in balancing. A choke was provided in the direct current bias circuit to block similar voltages induced in the winding $L_8$.

The output carrier voltage from the winding $L_7$ is fed over the lead P to the carrier windings $L_3$ and $L_4$ of the amplifier AMP.

The amplifier AMP functions in the way already described. When the switch CS is "on," the second harmonic output is modulated, the amplifier voice frequency being transmitted from the terminals $E_2$.

As has already been mentioned, the output from the switch CS in its "off" condition may be appreciable. It is therefore necessary to guard against the transmission by the amplifier AMP of a low-level signal when the switch CS is "off." For this purpose a condenser $C_4$, which in the particular case mentioned above had a value of .05 microfarads, was inserted between the carrier coils and the rectifier $r_2$ and a circuit $Z_7C_7$ was provided tuned to twice the carrier frequency and biassed back at N to a small negative voltage, say —3 volts, sufficient to suppress this low-level signal.

Thus the complete circuit of Fig. 6 represents a combined amplifier and switch which will only transmit an amplified voice frequency signal when the switch CS is "on" by virtue of the application of a direct current bias at the terminal $B_2$.

An alternative switch-amplifier could be constructed using as the amplifier AMP that of Fig. 5 instead of that of Fig. 3.

Referring to Fig. 7 switch-amplifiers of the type described above have been arranged as a selector for a voice frequency switching system. The selector has one input and $n$ outputs. Only one switch amplifier CS-AMP is shown in the drawing.

The output is selected by the application of a positive potential to the appropriate one of the $n$ control wires $D_1$—$D_n$. The voice frequency is applied through a single low-pass filter circuit $F_1$ common to the $n$ switch-amplifiers. The $n$ switch amplifiers need not then include input filters such as $Z_1C_1$ of Fig. 6. The common input filter $F_1$ is alone sufficient to obviate the appearance of carrier-frequency in the input voice-frequency circuit.

Application of a control potential to the control wire $D_1$ energises the coil $L_8$ (Fig. 6) of the carrier switch CS via the terminals $B_1$. This causes the second harmonic of the carrier frequency to appear in the coil $L_7$ in the manner already described. This frequency is extended over the P lead to the winding $L_3$—$L_4$ (Fig. 6) of the amplifier AMP where it is modulated by the applied voice frequency.

The modulated signal is demodulated by the rectifier $r_2$ and filtered at $Z_2C_2$ and an amplified voice-frequency output appears at the terminals $E_2$.

While a voice-frequency appears also at the inputs of the remaining $n$—1 amplifiers they give no output since in the absence of a potential on the corresponding D leads these amplifiers receive no carrier supply.

The input voice-frequency may be applied to the voice-frequency coils $L_1$ of the *n* amplifier, such as AMP, in parallel, as indicated in Fig. 7, or in series. If the series arrangement is employed the *n* coils $L_1$ may simply be connected across the voice frequency input terminals, or preferably the arrangement of Fig. 8 may be adapted. This arrangement comprises a ladder-network of which the first stage consisting of the condensers $C_1$ and $C_1'$ and the inductance $Z_1$ constitutes a filter protecting the input circuit. The remaining stages each consists of the voice frequency winding of one of the *n* amplifiers together with a condenser. The *n* voice-frequency coils are shown at $(L_1)_1$, $(L_1)_2$ . . . $(L)_n$ and the corresponding *n* condenser at $Q_1$, $Q_2$ . . . $Q_{n-1}$. The ladder network is terminated by a resistance $R_n$ chosen to match the impedance of the input circuit. The ladder network is then equivalent to the distortionless line, the frequency response being better than in the simple series-connected case. An element of time delay is of course introduced.

Fig. 9 shows an arrangement for a selector having *n* inputs and one output. In this case *n* switch-amplifiers of which only one CS—AMP is shown receive input signals through individual input filters. If a control potential occurs on the lead $D_1$, a voice-frequency path is available from the output of AMP at $E_2$ through the single common output filter $F_o$.

While the principles of the invention have been described above in connection with specific embodiments, and particular modifications thereof, it is to be clearly understood that this description is made only by way of example and not as a limitation on the scope of the invention.

What we claim is:

In combination, a magnetic switch comprising a second-harmonic transformer having a primary, a secondary and a control winding, a magnetic amplifier comprising a second-harmonic transformer having a primary, a secondary and a control winding, means for applying a continuous alternating-current potential to the primary winding of the switch transformer, means for applying a direct-current potential to the control winding of the switch transformer during selected intervals of time to cause alternating current to be induced in the secondary winding of the switch transformer during corresponding intervals of time, means for connecting the secondary winding of the amplifier transformer to the primary winding of the amplifier transformer and for transferring the said induced alternating current to the primary winding of the amplifier transformer, means for applying a continuous direct-current potential to the control winding of the amplifier transformer to cause alternating current from the primary winding thereof to be induced in the secondary winding thereof during the said intervals of time, means for applying a continuous information-bearing signal to the secondary winding of the amplifier transformer to modulate the last-said alternating current, and demodulating means connected to the primary winding of the amplifier transformer for demodulating the said modulated alternating current to obtain the information-bearing signals applied to the secondary winding of the amplifier transformer during said interval of time.

References Cited in the file of this patent

UNITED STATES PATENTS

| | | |
|---|---|---|
| 2,108,642 | Boardman | Feb. 15, 1938 |
| 2,164,383 | Burton | July 4, 1939 |
| 2,218,711 | Hubbard | Oct. 22, 1940 |
| 2,548,049 | Olson | Apr. 10, 1951 |
| 2,548,176 | Semm | Apr. 10, 1951 |
| 2,585,332 | Logan | Feb. 12, 1952 |
| 2,585,654 | Hewlett | Feb. 12, 1952 |
| 2,650,986 | Semm | Sept. 1, 1953 |
| 2,850,725 | Beaumont | Sept. 2, 1958 |
| 2,853,693 | Lindenblad | Sept. 23, 1958 |

OTHER REFERENCES

William A. Geyger: "Magnetic-Amplifier Circuits," McGraw Hill Book Company, Inc. (Fig. 5.12 pages 71–77), publ. Jan. 29, 1954.

UNITED STATES PATENT OFFICE
CERTIFICATION OF CORRECTION

Patent No. 2,947,946 August 2, 1960

Harry Grayson et al.

It is hereby certified that error appears in the above numbered patent requiring correction and that the said Letters Patent should read as corrected below.

Column 2, lines 3 and 4, the equation should appear as shown below instead of as in the patent:

$$EI = \frac{B^2_{max} \quad VF.\ 10^{-7}}{4\mu}$$

line 7, for "f" read -- μ --; same column 2, lines 10 to 12, the two equations should appear as shown below instead of as in the patent:

$$B_{max} = 8,000 \text{ gauss}$$
$$\mu = 1,000 \text{ gauss/oersted}$$

Signed and sealed this 16th day of May 1961.

(SEAL)
Attest:
ERNEST W. SWIDER
Attesting Officer

DAVID L. LADD
Commissioner of Patents